United States Patent [19]
Rosengren et al.

[11] Patent Number: 5,639,136
[45] Date of Patent: Jun. 17, 1997

[54] MULTIMOTION ACTUATOR FOR A ROTARY GRIPPER

[75] Inventors: Gary W. Rosengren, Brooklyn Park; Philip M. Poeschl, Roseville, both of Minn.

[73] Assignee: Tol-O-Matic, Inc., Hamel, Minn.

[21] Appl. No.: 394,715

[22] Filed: Feb. 27, 1995

[51] Int. Cl.$^6$ ............................................. B25J 15/08
[52] U.S. Cl. ........................ 294/86.41; 294/88; 294/115; 901/37
[58] Field of Search ................. 294/86.41, 88, 294/106, 115, 119.1; 74/29, 31, 422; 92/2, 136; 414/620, 732, 735, 739; 901/25, 29, 30, 31, 36, 37

[56] References Cited

U.S. PATENT DOCUMENTS

| | | |
|---|---|---|
| 3,312,496 | 4/1967 | Boutelle et al. ............... 294/88 X |
| 3,377,799 | 4/1968 | Geyer . |
| 3,429,195 | 2/1969 | Bassoff . |
| 3,432,042 | 3/1969 | Baute et al. ............... 294/115 X |
| 3,682,327 | 8/1972 | Winne ............... 901/25 X |
| 3,734,556 | 5/1973 | Misawa ............... 295/88 |
| 3,773,189 | 11/1973 | Kitamura et al. ............... 901/37 X |
| 3,786,938 | 1/1974 | Kirkham . |
| 3,815,479 | 6/1974 | Thompson . |
| 4,111,100 | 9/1978 | Boyer . |
| 4,119,017 | 10/1978 | Nusbaumer et al. . |
| 4,132,153 | 1/1979 | Grotness et al. . |
| 4,134,306 | 1/1979 | Grotness et al. . |
| 4,244,618 | 1/1981 | Boyer et al. . |
| 4,577,898 | 3/1986 | Nusbaumer et al. . |
| 5,241,896 | 9/1993 | Braun et al. . |

Primary Examiner—Johnny D. Cherry
Attorney, Agent, or Firm—Dorsey & Whitney LLP

[57] ABSTRACT

The present invention provides a rotary gripper for robotic use including a support portion for connection to a robotic apparatus, a gripper head movably mounted on the support portion and carrying a pair of opposed gripping fingers, a first drive mechanism for opening and closing the gripper fingers and a second drive mechanism for rotating the gripper head. The drive mechanisms are generally transverse relative to each other and each includes at least one pneumatically driven, reciprocating piston. In the first drive mechanism, a pinion gear is operably connected to the piston for reciprocating movement therewith. The piston in the second drive mechanism is operably coupled to a rack engaging the pinion gear to turn the gear, thereby moving the gripper head relative to the support portion.

15 Claims, 4 Drawing Sheets

5,639,136

MULTIMOTION ACTUATOR FOR A ROTARY GRIPPER

BACKGROUND OF THE INVENTION

1. Field of the Invention

The present invention relates to mechanical manipulating devices. In particular, it relates to an actuator for a compact gripping implement intended primarily for robotic applications for grasping, holding and moving an object or workpiece, wherein the gripper is rotatable.

2. Description of the Prior Art

As shown in U.S. Pat. No. 3,815,479 (Thompson), compound motion actuators are known. The actuator disclosed by Thompson is a fluid actuator for producing simultaneously or separately both reciprocating and turning motions. It includes a rotary power device coupled to a reciprocal piston such that the piston rod connected to the piston has imparted thereto the reciprocal motion of the piston as well as the rotary motion of the rotary device. Although the piston is coaxially connected to the rotating gear of the rotary actuator, the invention requires a guide rod telescopically fitted into the hollow piston rod for controlling the rotation thereof and a housing for the rotary actuator which is located at one end of the power cylinder for containing the piston. Thus, the actuator is not as simple in construction, compact or symmetrical as possible.

U.S. Pat. No. 4,134,306 (Grotness et al.) discloses a rotary actuator for converting reciprocating motion to rotary motion. The disclosed actuator includes a bellows arrangement connected to a rack whereby expansion and contraction of the bellows causes linear movement of the rack, thereby imparting rotary movement to the pinion.

U.S. Pat. No. 3,377,799 (Geyer) discloses a rack and pinion for providing rotational movement to a shaft. However, this patent does not appear to show relative sliding movement between the teeth of the pinion and the teeth of the rack. Somewhat similarly, U.S. Pat. No. 3,429,195 (Bassoff) relates to a lead generating mechanism having a plurality of rack and pinion mechanisms for rotating a work spindle. Although the Bassoff patent discloses a work table which is designed for reciprocal movement in the direction of the arrow shown in FIG. 1, it does not appear that any of the individual rack and pinion members are slidably movable relative to one another.

U.S. Pat. No. 3,786,938 (Kirkham) discloses a reversing drive for a tool changer. The Kirkham patent does appear to disclose a pair of racks (FIG. 2) and a pair of pinions in the form of rotatable gears having teeth which mesh with the teeth of the racks and are slidably associated with the racks in response to the movement of a piston rod. The axially extending or elongated teeth of the unitary rack structure also function as an axial guide for the gears. However, the Kirkham patent does not disclose the combination of a piston/cylinder arrangement and rack and pinion mechanisms for the operation and positioning of a rotatably positionable gripper head, nor does it disclose a multimotion actuator having a combination cylinder/piston and rack and pinion arrangement, in which the rack is disposed between a pair of pistons, thereby providing for a more symmetrical, compact device.

SUMMARY OF THE INVENTION

The present invention provides a multimotion actuator or drive mechanism for a rotatable gripper for robotic use. Broadly, the gripper comprises a support portion for connection to a robotic apparatus, a head movably connected to the support portion and an operator movably carried by the head for operating on a workpiece. The actuator comprises a first drive mechanism for actuating the operator, and a second drive mechanism for moving the head.

More specifically, the gripper of the present invention comprises a main support body portion for connection to a robotic apparatus, and a gripper head rotatably mounted on the support body portion and carrying a pair of opposed gripping fingers. The actuator (i.e., the drive means or drive mechanism) includes a first drive mechanism for opening and closing the gripper fingers and a second drive mechanism for rotating the gripper head. The first and second drive mechanisms are operably linked and contained substantially within the support body portion. With respect to each other, the first and second drive mechanisms are generally perpendicular, crossing at approximately ninety degrees. Each drive mechanism has a generally central longitudinal axis, each axis lying in a respective one of two closely adjacent, parallel planes, i.e., the drive mechanisms are offset slightly from being exactly coplanar. Each drive mechanism includes at least one pressure driven, reciprocating piston. In the first drive mechanism, a pinion gear is operably connected to the piston for axial movement therewith. The piston in the second drive mechanism is operably coupled to a rack engaging the pinion of the first drive mechanism.

It is an object of the present invention to provide an improved multimotion actuator. An advantage of the present invention is that the actuator is compact and substantially symmetrical.

It is another object of the present invention to provide a multimotion actuator including two discrete drive mechanisms operably connected or linked by a rack and pinion, wherein one drive mechanism reciprocates to open and close a pair of workpiece gripping fingers with respect to each other and wherein the second drive mechanism reciprocates to rotate the first drive mechanism or portions thereof to reposition the pair of gripping fingers.

A feature of the transverse, dual drive mechanism multimotion actuator of the present invention is that one of the drive mechanisms includes a piston/cylinder arrangement for axially moving a reciprocating first shaft carrying a pinion gear to actuate the pair of gripper fingers with respect to each other and the second drive mechanism, i.e., the rotary actuator, includes a piston/cylinder arrangement and a reciprocating rack meshed with the pinion for rotating the first shaft to rotatably reposition the gripper fingers without requiring the use of multiple, concentrically arranged shafts. An advantage of the present invention is that it is very compact and symmetrical because the two drive mechanisms lie in two closely adjacent, parallel planes. In a preferred embodiment, the balance and symmetry is enhanced by providing for a piston/cylinder arrangement at each end of the rack connected to the pinion for rotating the gripper operating shaft. These features and advantages help reduce stress on the joints and elongated connection and suspension members frequently found in robotic machines.

These and other objects, features and advantages of the present invention will become more apparent with reference to the drawings, the description of the preferred embodiment and the appended claims.

DESCRIPTION OF THE PREFERRED EMBODIMENT

This description of the preferred embodiment is intended to be read and understood in conjunction with drawings. With regard to means for fastening, mounting, attaching, joining or connecting components of the present invention to form the multimotion actuator and the rotary gripper apparatus as a whole, unless specifically described as otherwise, such means are intended to encompass conventional fasteners such as machine screws (depicted), rivets, nuts and bolts, toggles, pins, or the like. Other fastening or attachment means appropriate for connecting components include friction or press fitting, welding and soldering, the latter particularly with regard to any electrical components, such as sensors or position monitors. Unless specifically otherwise disclosed or taught herein, the materials from which the various components of the present invention, for example the body or the cylinders for receiving the pistons and other components, may be selected from appropriate materials such as ceramics, aluminum, steel or metallic alloys, including hardened alloys. Various plastics, fiberglass or the like may be used where appropriate.

Despite the foregoing indication that components and materials for use in the rotary gripper and multimotion actuator of the present invention may be selected from commercially available, appropriate items, the following detailed description sets forth specific items and steps for use in the present invention. It is possible that those skilled in the state of the art will be able to recognize and select equivalent items.

Figure 1:
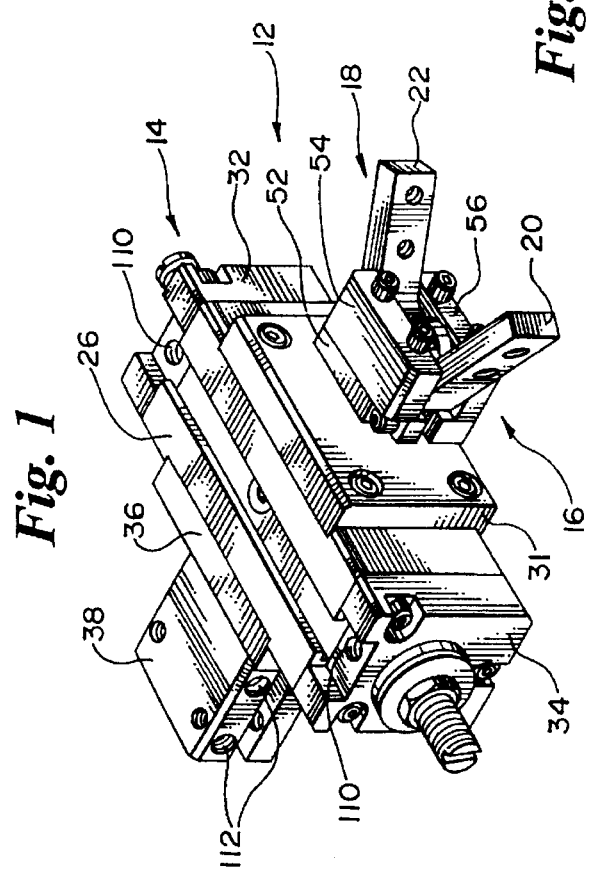
FIG. 1 is a perspective view of a rotary gripper including the multimotion actuator of the present invention.

In the following description, references to the terms right and left, top and bottom, upper and lower and horizontal and vertical are to be read and understood with their conventional meanings and with reference to viewing the present invention as it is shown in FIG. 1.

Referring then to the drawings, particularly FIG. 1, the rotary gripper 12 and its multimotion actuator comprise a main body portion 14, a gripper head 16 movably connected to the main body portion 14 and a tool 18 comprising a pair of workpiece gripping fingers 20, 22 carried by the gripper head 16. As shown in FIGS. 2–5 and described below, the body 14 is adapted to be connected to a robotic material handling machine (not shown), and houses and supports a first linear, reciprocating drive mechanism for actuating the tool 18 and a second linear, reciprocating drive mechanism for rotatably positioning the head 16.

The main body 14 comprises a generally rectangular base block 26 with a generally central cylindrical chamber 28 having an open end at each side wall of the base block. The front and rear side walls of the base block 26 each have an aligned, generally central aperture 29. The apertures 29, with the portion of the chamber 28 therebetween, define a transverse bore. A front tool mounting block 31 is secured to the front side of the base block 26. Right and left side plates 32, 34, respectively, are mounted on each side of the base block 26. A rear cylinder plate 36 is mounted on the rear of the base block 26, and a rear housing 38 is mounted on the cylinder plate 36. Each side plate 32, 34 includes a shock and mounting assembly, indicated generally at 40 in FIG. 2. Each shock and mounting assembly 40 comprises a threaded shaft 42 which is received in the respective side plate 32, 34. The end of the shaft 42 lying in the chamber 28 carries a Nylon bumper 44 or other shock absorption or cushion means and the other end extends outwardly from the respective side plate 32, 34 whereby the gripper 12 may be attached to a robotic apparatus. An appropriate sealing and mounting arrangement, i.e., seal 46, washer 48, hex nut 50 and other appropriate hardware are used to mount the shock and mounting assemblies 40 on each side of the main body 14.

Figure 3:
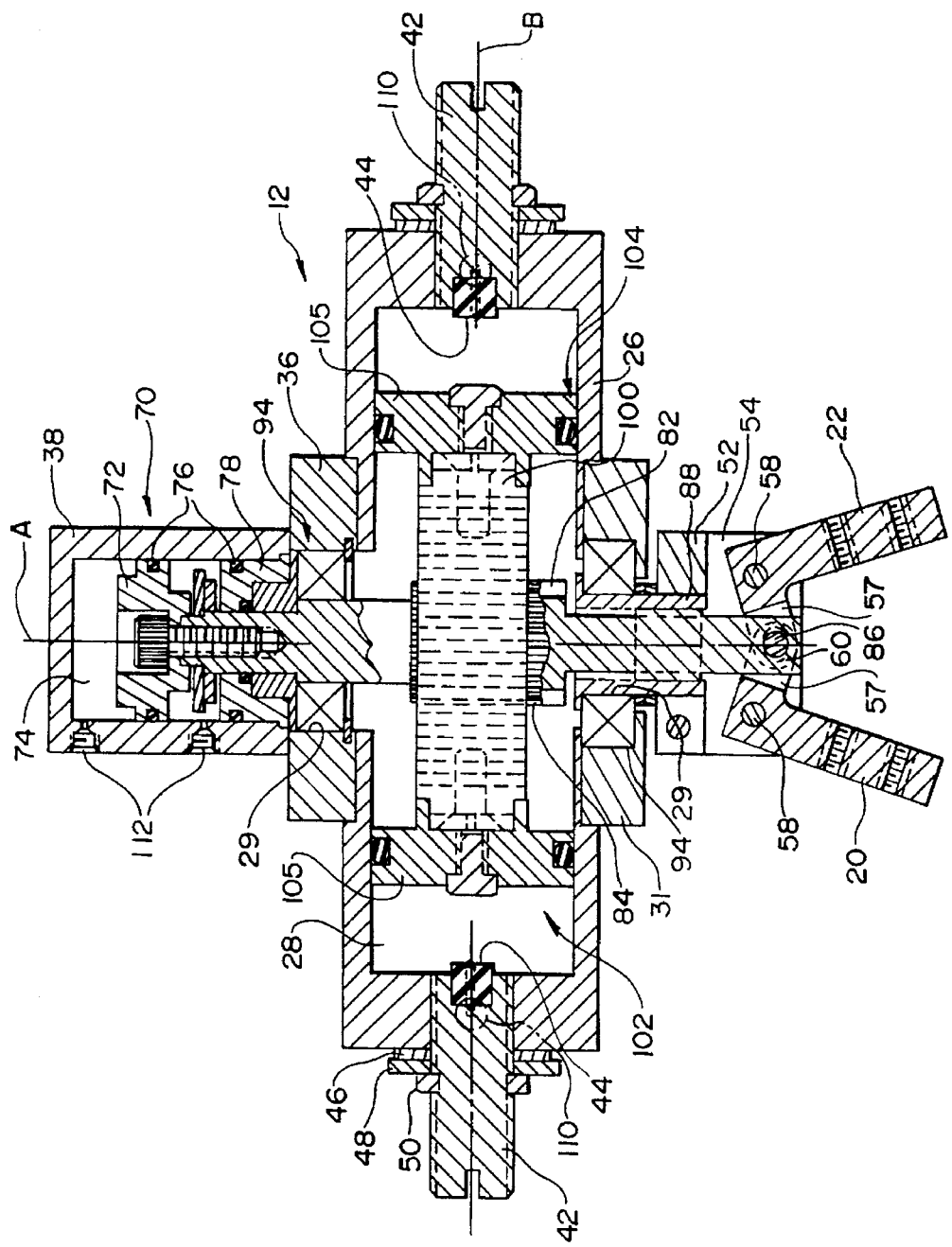
FIG. 3 is a sectional plan view taken along line 3—3 in FIG. 2.

Referring to FIGS. 1 and 3, the gripper head 16 is attached to the front tool mounting block 31. A mounting plate 52 is attached to the front mounting block 31 and carries upper and lower blocks 54, 56 which capture and pivotally support the gripper fingers 20, 22. The base portion 57 of the gripper fingers 20, 22 carries top and bottom pivot pins 58 which are captured in the upper and lower blocks 54, 56. Each pin base portion 57 also includes a base lobe 60 having an aperture 62.

Figure 4:
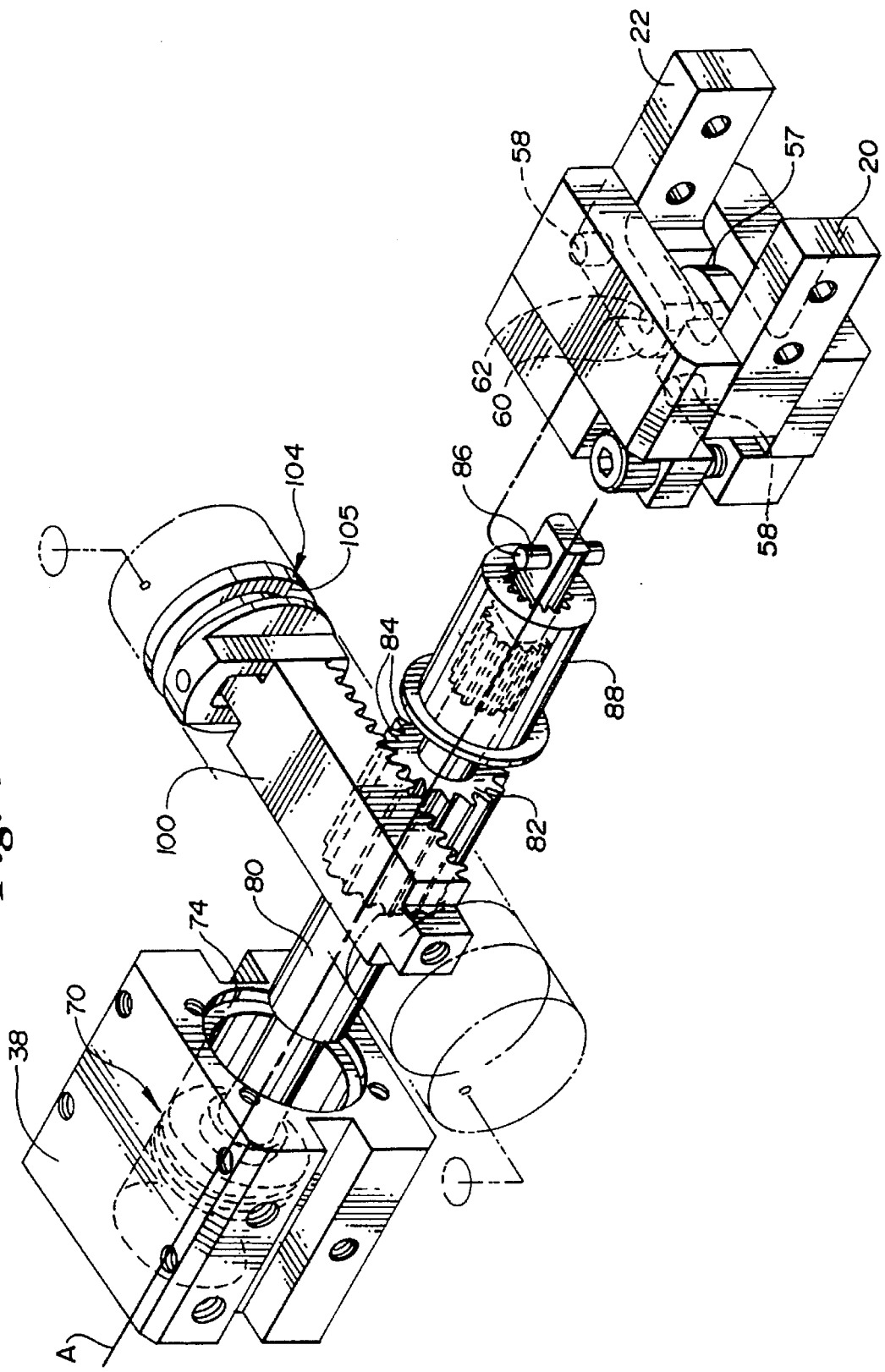
FIG. 4 is a perspective mechanical diagram of the present invention, with some components shown in hidden lines and with portions omitted for clarity of description, depicting the first and second drive mechanisms of the multimotion actuator and depicting the gripper in one operational position.
Figure 5:
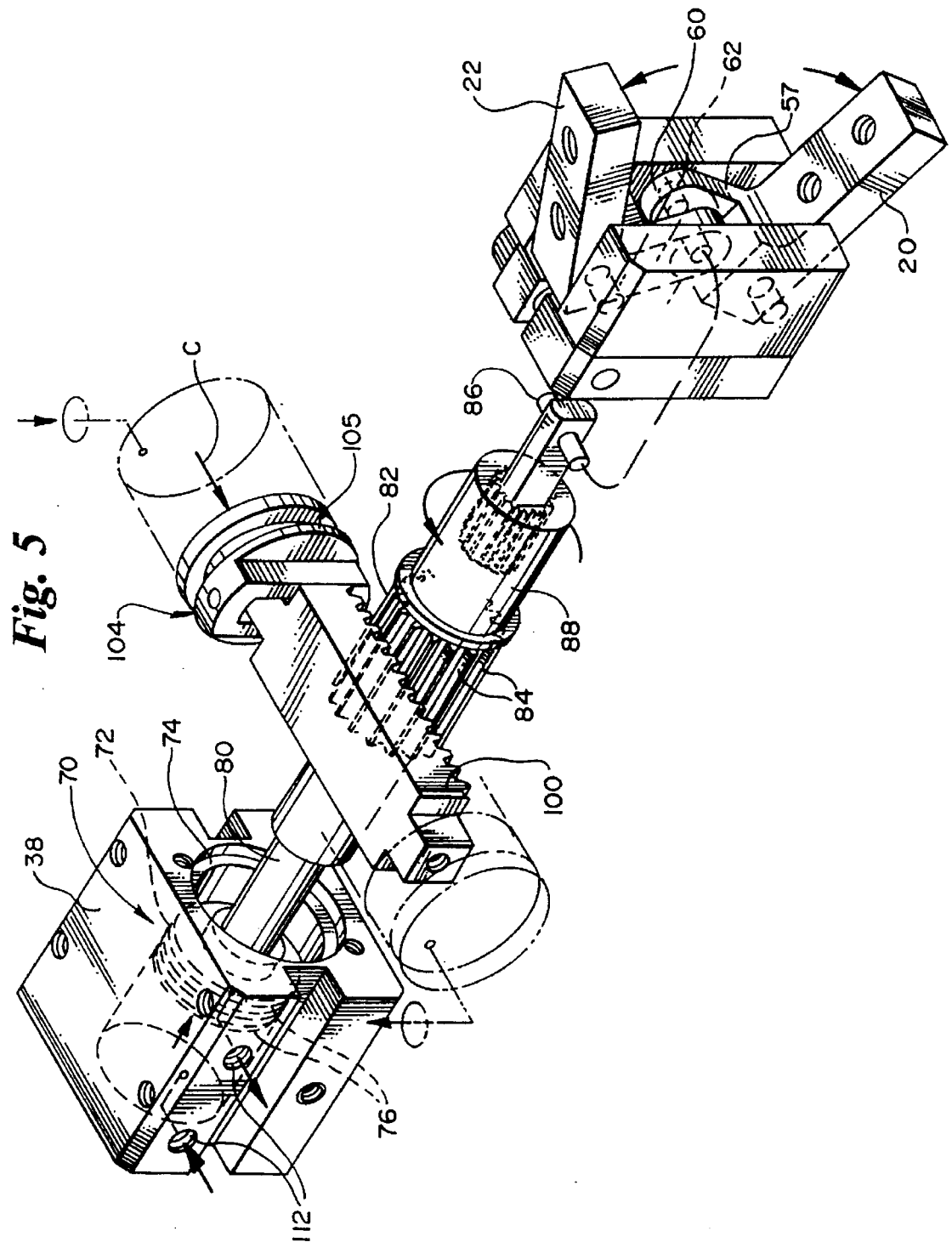
FIG. 5 is a view similar to that of FIG. 4 with the gripper and the actuator depicted in a second operational position, and with arrows depicting the movement from the position depicted in FIG. 4 to that depicted in FIG. 5.

Referring to FIGS. 3, 4 and 5, the multimotion actuator of the present invention includes a first drive mechanism for operating, i.e., opening and closing, the gripper fingers 20, 22 with respect to each other. The first drive mechanism has a central longitudinal axis of operation indicated at line "A" in FIG. 4 and extends generally in a straight orientation from front to rear of the gripper 12, from the rear housing 38 to the base portion 57 of the gripper fingers 20, 22. The first drive mechanism includes a rear piston assembly 70, including a piston 72, received in a cylinder 74 substantially within the rear housing 38. Appropriate seals and washers shown at 76 in FIG. 3 are provided to ensure a pneumatic seal around the piston 72. A ring-like shaft guide 78 is provided. The piston 72 is fixed to an elongated, rod-like pinion shaft 80. Generally midway along its length, the pinion shaft 80 carries a pinion gear 82 having gear teeth 84 which extend substantially radially outwardly from the longitudinal axis "A", as well as generally parallel along the length of axis "A". At its forward end, the pinion shaft 80 carries a pin 86. The pin 86 is received in the aperture 62 in each lobe 60 of the fingers 20, 22. The forward end of the pinion shaft 80 slides axially relative to an annular spline ring 88 which is fit into the bearing 94. The mounting plate 52 (FIG. 1) is clamped to the spline ring 88 for rotation therewith. Both the rear and forward ends of the pinion shaft 80 are supported by appropriate ball bearing arrangement, as indicated generally at reference character 94 in FIG. 3.

Figure 2:
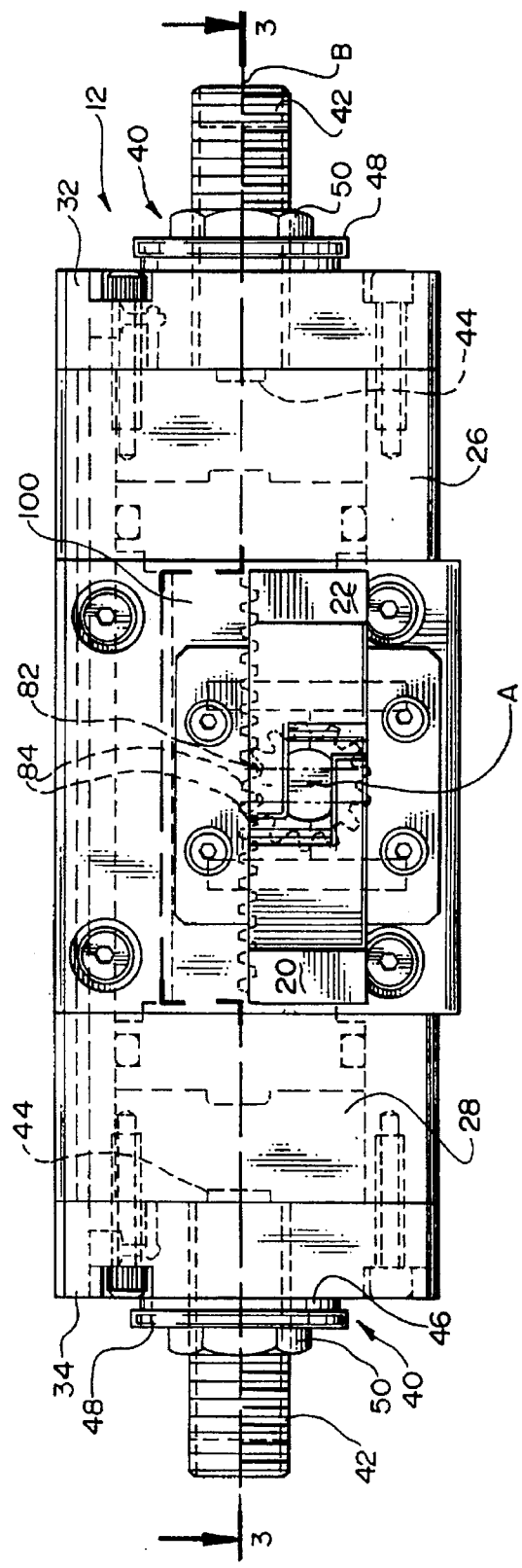
FIG. 2 is a front elevational view thereof with hidden lines depicting some of the components of the multimotion actuator.

With reference to FIGS. 2 and 3, the second drive mechanism of the multimotion actuator of the present invention is substantially perpendicular with respect to the first drive mechanism described in the immediately previous paragraph. The second drive mechanism comprises a generally central rack 100 with two opposed ends and teeth on one side. A piston arrangement 102, 104, including a piston 105, is carried at or attached to each end of the rack 100. The second drive mechanism has a generally central longitudinal axis of operation depicted at line "B". Each side plate 32, 34 includes a port 110 for receiving or evacuating a fluid for driving the second drive mechanism back and forth as will be described herein below. Similarly, the rear housing 38 includes a pair of ports 112 whereby the first drive mechanism can be positively driven forwardly and rearwardly.

Referring to FIGS. 4 and 5, the operation of the multimotion actuator and, consequently, the rotary gripper of the present invention is depicted. In FIG. 4, the gripper fingers 20, 22 are shown in their closed position (closest together) and with their operational motion in a generally horizontal plane. In FIG. 5, the gripper fingers 20, 22 are open and have been repositioned relative to the main body 14 (not shown) so that the opening and closing motion takes place in a vertical plane. This repositioning is accomplished by moving the second operating mechanism in the direction depicted by arrow "C" in FIG. 5 by pressurizing the portion of the central bore 28 on one side of the rack 100, i.e., between side plate 32 and piston arrangement 104, driving the rack 100 to the left as shown in FIG. 5 and rotating the gripper head 16 90° from the position depicted in FIG. 4. Charging or pressurizing the portion of the bore 28 on the other side of the rack 100, i.e., between the piston arrangement 102 and side plate 34, and/or evacuating the portion of the central bore 28 between the piston 104 and the side plate 32 has the opposite effect of returning the rack 100 and gripper head 16 to the position depicted in FIG. 4.

With respect to the opening and closing of the gripper fingers 20, 22, pressurization of the rearmost portion of the cylinder in the rear housing 38 through the rearmost port 112 drives the piston 72 forwardly, in turn driving the rigid pinion shaft 80 forwardly and opening or spreading the free ends of the gripper fingers 20, 22. Charging the forward portion of the cylinder through the front port 112 and/or evacuating the rear portion drives the piston arrangement 70 and pinion shaft 80 rearwardly, moving the gripper fingers 20, 22 toward each other to the position depicted in FIG. 4. It should be appreciated that the forward and rearward reciprocal movement of the pinion shaft 80 and the pinion gear 82 carried thereby causes the teeth 84 of the gear 82 to slide in and relative to the teeth of the rack 100 in which they are engaged. Both of the motions or operations of the present invention, that is the opening and closing of the gripper fingers 20, 22 and the rotational repositioning of the gripper head 16, can be obtained at the same time or may be accomplished separately.

FIG. 2 depicts that the longitudinal axes of operation for the first drive mechanism (line "A", which appears as a point) and the second drive mechanism (line "B") lie in closely adjacent parallel planes, helping to provide a multimotion actuator which is compact and symmetrical.

While pneumatic operation of the present invention is depicted, it should be appreciated that the operation, with appropriate changes in the sealing structure, may be provided by pneumatic or hydraulic means.

While FIGS. 4 and 5 depict a rotational movement of the gripper head through 90°, it should be appreciated that the amount of rotation can be varied by varying the travel of the rack 100. An advantage of the multimotion actuator of the present invention is that the second drive mechanism for rotationally repositioning the gripper fingers 20, 22 includes a piston arrangement at each end of the rack 100. This enables the very precise positive repositioning of the gripper head 16. While one type of gripper fingers 20, 22 is depicted, it should be appreciated that other gripper mechanisms could be used and driven by the actuator of the present invention, such as parallel grippers. While the rotary gripper of the present invention is particularly well adapted for use with robotic implements including mechanical arms, it may be used as part of a fixed apparatus for repositioning objects or workpieces passing on a conveyor or material handling apparatus.

Although the description of the preferred embodiment has been quite specific, it is contemplated that various changes, including those mentioned above, could be made without deviating from the spirit of the present invention. It is therefore desired that the described embodiments be considered in all respects as illustrative, not restrictive, and that the scope of the present invention be dictated by the appended claims rather than by the description of the preferred embodiment.

What is claimed is:

1. A rotary gripper comprising:
   a gripper;
   a first drive mechanism for opening and closing the gripper, said first drive mechanism including a pinion gear; and
   a second drive mechanism for rotating the gripper, said second drive mechanism including a piston operably coupled to a rack engaging the pinion gear, said pinion gear slidable with respect to the rack while engaged therewith.

2. The rotary gripper according to claim 1, wherein the first and second drive mechanisms each have a generally central, elongated axis of operation in a plane, the planes closely adjacent and generally parallel.

3. The rotary gripper according to claim 2, wherein the first drive mechanism is movable axially along its generally central, elongated axis of operation.

4. The rotary gripper according to claim 3, wherein the pinion gear has teeth extending generally radially, said teeth also extending generally parallel to the axis of operation of the first drive mechanism.

5. A compound motion device comprising:
   a tool for operative engagement with a workpiece;
   a first drive mechanism for actuating the tool, said first drive mechanism including a pinion gear; and
   a second drive mechanism for positioning the tool, said second drive mechanism generally transverse relative to the first drive mechanism and including a piston operably coupled to a rack engaging the pinion gear, said pinion gear slidable with respect to the rack while engaged therewith.

6. The compound motion device according to claim 5, said first and second drive mechanisms each having an elongated, generally central axis, each of said axes lying in a plane, said planes closely adjacent and generally parallel, said axes transverse with respect to each other.

7. An implement for use with a robotic device comprising:
   a support portion for connection to the robotic device;
   a tool head movably connected to the support portion;
   a tool carried by the tool head for operative engagement with a workpiece; and
   a first drive mechanism for actuating the tool and a second drive mechanism for moving the tool head, said first and second drive mechanisms generally perpendicular with respect to each other, said first drive mechanism including a piston, a piston rod operably coupled to the piston and a pinion gear fixedly connected to the piston rod, said second drive mechanism including a piston operably coupled to a rack engaging the pinion gear, said pinion gear slidable with respect to the rack while engaged therewith.

8. The implement according to claim 7, wherein the first and second drive mechanisms each have a generally central, elongated axis of operation, and wherein the first drive mechanism is movable along the axis of operation of the first drive mechanism to actuate the tool and the second drive mechanism is movable along the axis of operation of the second drive mechanism to move a portion of the first drive mechanism around the axis of operation of the first drive mechanism to move the tool head relative to the support portion.

9. The implement according to claim 8, wherein the tool may be actuated while the tool head is being moved.

10. The implement according to claim 9, wherein the first drive mechanism is reciprocatingly movable axially along the axis of operation of the first drive mechanism to actuate the tool and the second drive mechanism is reciprocatingly movable axially along the axis of operation of the second drive mechanism to rotate a portion of the first drive mechanism around its axis of operation to move the tool head relative to the support portion.

11. A compound motion device for positioning and actuating a workpiece gripping tool, said compound motion device comprising a rack with a first and second end, the first end operably coupled to a first reciprocating piston, the rack operably engaging a pinion gear operably coupled to a second reciprocating piston movable generally transversely with respect to the rack, said pinion gear transversely slidable with respect to the rack while operably engaged therewith.

12. The compound motion device according to claim 11, wherein the second end of the rack is operably coupled to a third reciprocating piston.

13. The compound motion device according to claim 12, wherein the movement of the rack positions the workpiece gripping tool and the transverse slidable movement of the pinion gear actuates the workpiece gripping tool.

14. A compound motion device comprising:

a tool head;

a drive mechanism having a pinion gear, said pinion gear being operatively connected with said tool head and being rotatable about a first axis and moveable axially along said first axis;

a rack operatively engaging said pinion gear and being selectively moveable in a generally transverse direction relative to said first axis, whereby said transverse movement causes rotation of said pinion gear and tool head, said pinion gear being slidable with respect to said rack while engaged therewith.

15. The device of claim 14 wherein said tool head is a gripper.

* * * * *